No. 855,381. PATENTED MAY 28, 1907.
A. BEARSE.
GUY WIRE FASTENER.
APPLICATION FILED MAR. 12, 1907.
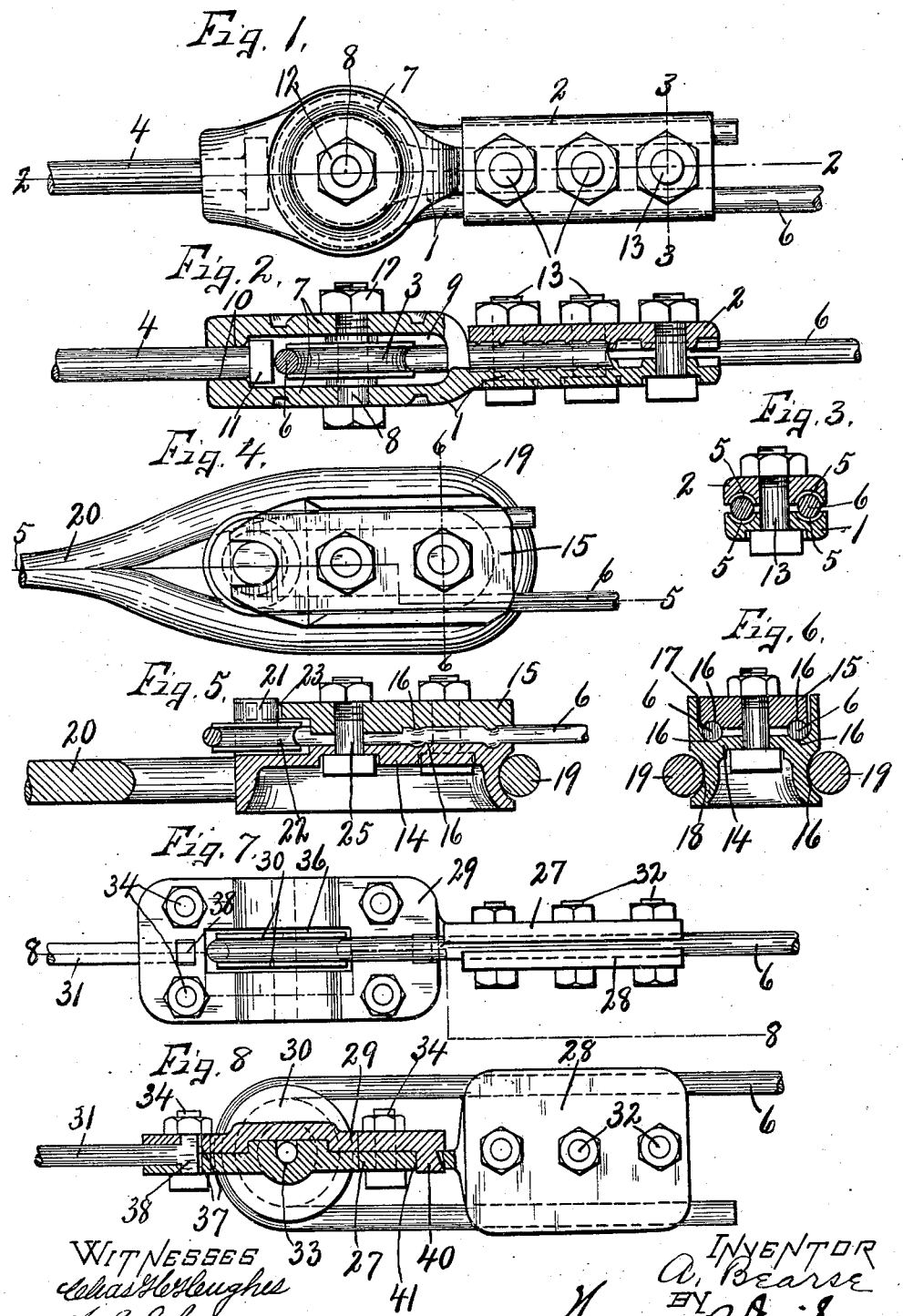

UNITED STATES PATENT OFFICE.

AARON BEARSE, OF SYRACUSE, NEW YORK, ASSIGNOR OF ONE-HALF TO
N. C. PANGBURN, OF ALBANY, NEW YORK.

GUY-WIRE FASTENER.

No. 855,381.  Specification of Letters Patent.  Patented May 28, 1907.

Application filed March 12, 1907. Serial No. 361,962.

*To all whom it may concern:*

Be it known that I, AARON BEARSE, of Syracuse, in the county of Onondaga, in the State of New York, have invented new and useful Improvements in Guy-Wire Fasteners, of which the following, taken in connection with the accompanying drawings, is a full, clear, and exact description.

This invention relates to certain improvements in fasteners for guy wires in which the anchor rod and wire clamps are coupled together and constitute a single article of manufacture to be sold and used as such so that the anchor rod with the wire clamps thereon may be anchored in the ground to a suitable anchor plate embedded therein or it may be attached directly to a pole or other fixed support capable of resisting the pull upon the guy wire which is held by the clamping plates and attached to another pole which it may be desired to hold in place.

My main object, therefore, is to combine the anchor rod and clamping plates with a suitable roller bearing constituting a single article of manufacture, the roller bearing serving as a sheave around which the guy wire may be rendered during the tightening operation leaving portions of the tightened wire in position to be conveniently clamped between the clamping plates.

Another object is to couple the anchor rod to one of the anchor plates in such manner that it may be removed or replaced at will and still be able to withstand any ordinary strains when coupled to the clamping plate without liability of accidental separation therefrom.

A further object is to mount the roller or sheave upon one or both of the clamping plates with the annular wire bearing thereof in a plane coincident with the meeting faces or wire grooves in the clamping plates so that when the guy wire is tightened the portions thereof adjacent to the clamping plates may be readily brought between and within the gripping faces of said plates so that the labor and time consumed in clamping the wire are reduced to a minimum.

Other objects and uses will be brought out in the following description:

In the drawings,—Figure 1 is a top plan of one form of my improved guy wire fastener. Figs. 2 and 3 are respectively longitudinal and transverse sectional views taken on lines 2—2 and 3—3, Fig. 1. Fig. 4 is a top plan of a modified form of fastener. Figs. 5 and 6 are sectional views taken respectively on lines 5—5 and 6—6, Fig. 4. Fig. 7 is a side elevation of a further modified form of my invention, and Fig. 8 is a sectional view taken on line 8—8, Fig. 7.

The device shown in Figs. 1, 2 and 3 comprises essentially a pair of clamping plates —1— and —2—, a roller bearing or sheave —3— and an anchor rod —4—. The clamping plates —1— and —2— are provided with opposite parallel grooves —5— having knurled or rough gripping faces for receiving and gripping the guy wire as —6—, one end of the plate —1— and plate —2—, in which the gripping faces —5— are formed, being located at one side of the roller or sheave —3— while the opposite end of the clamping plate —1— is provided with a suitable housing —7— partially inclosing the sheave —3— and having its opposite sides formed with suitable apertures for the reception of a bolt or stud —8— which forms a bearing for the sheave —3—. This housing —7— is formed with a transverse opening —9— in which the roller bearing —3— and adjacent portions of the guy wire —6— play, the opposite sides of said housing being united at diametrically opposite sides of the roller bearing —3— and the end of the housing opposite to that to which the clamping plate —2— is secured is provided with an aperture —10— through which is inserted the anchor rod —4— having a head —11— of greater cross-sectional area than the aperture —10— for engaging the adjacent end of the housing and locking the anchor rod thereto. The bearing or stud —8— for the roller —3— is held in place by a nut —12— and may be removed from the housing to permit the removal of the roller —3— when inserting or removing the anchor rod —4— which is done by passing said rod through the aperture —10— from the inner end of said aperture until the head —11— is brought into engagement with the adjacent end of the housing as shown in Fig. 2 whereupon the roller —3— may be placed in position and retained by the bolt —8— and its nut —12—. This roller —3— and also the opening —9— in which it plays are disposed in the plane substantially coincident with the meeting faces of the clamping plates —1— and —2— so as to bring the adjacent portions of the guy wire —6— which is passed around the roller —3— into registration or alinement with the meeting faces of the clamping plates when the guy wire is tightened whereupon the portions of the guy wire lying along the opposite meeting edges of the clamping plates may be pressed inwardly into their respective grooves and the clamping plates tightened by suitable clamping bolts —13— as best seen in Figs. 1, 2 and 3, said clamping bolts —13— being located between the opposite grooves —5— and, therefore, between the adjacent portions of the guy wire.

In operation, the anchor rod —4— is first secured in position either in the ground or to a pole or post above the ground and one end of the guy wire —6— is secured to the pole which it is desired to sustain, after which the opposite end of the guy wire is looped around the roller —3— and drawn tightly by suitable tackle blocks, not shown, after which the portions of the wire which now lie along the opposite meeting edges of the clamping plates are forced between said plates into their respective grooves —5— and clamped in position by the bolts —13— thereby permanently retaining the guy wire in its tightened position.

In Figs. 4, 5 and 6 I have shown a modified form of my invention consisting of a pair of clamping plates —14— and —15— as provided with opposite parallel grooves —16— for receiving the adjacent portions of the guy wire —6—. The clamping plate —15— is loosely fitted in a recess —17— in the adjacent face of the clamping plate —14— which latter is of substantially the same length as the plate —15— and is provided with a marginal groove —18— extending around its sides and one end for the reception of an eye —19— of an anchor rod —20—, said eye being closely fitted in the groove —18— to rigidly lock the anchor rod —20— to the plate —14— leaving the other clamping plate —15— free to be removed or reinserted for clamping or releasing the guy wire. In this device shown in Figs. 4 to 6 inclusive the clamping plate —14— is provided with an integral stud —21— upon which is journaled a roller bearing or sheave —22— while the clamping plate —15— is formed with a recess —23— for receiving said stud, the adjacent end of the plate —15— extending around the sides of the stud —21— to retain the roller bearing or sheave —22— upon its supporting spindle —21—. These clamping plates are drawn together upon the guy wire by means of clamping bolts —25— which are located midway between the grooves —16— and, therefore, between the opposite sides of the loop of the wire —6—.

The device shown in Figs. 7 and 8 comprise essentially a pair of clamping plates —27— and —28—, and an additional clamping plate —29— together with a sheave —30— and tie rod —31—. The clamping plates —28— and —29— are mounted end to end upon the clamping plate —27—, which latter is practically co-extensive in length with the combined length of the plates —28— and —29— but the opposite ends of this plate —27— are substantially flat and disposed in planes at substantially right angles to each other so that the plate —28— is offset in a plane at substantially right angles to the plate —29—. These plates —27— and —28— are provided on their adjacent faces with lengthwise parallel grooves for receiving between them the adjacent portions of the guy wire —6—, said plates being clamped together by suitable bolts —32— to secure the guy wire between them. The roller bearing or sheave —30— is journaled in an open sided bearing —33— in the plate —27— and the plate —29— extends across the open sides of the bearing —33— and is secured to the sides by suitable clamping bolts —34—, the plates —27— and —29— are formed with transverse alined openings —36— in which the roller —30— operates, said plates being also formed with alined openings —37— for receiving a T-shape head —38— on the adjacent end of the anchor rod —31— so that when the plates —27— and —29— are clamped together the adjacent end of the rod —31— is locked between them and may be removed by simply separating the plates and withdrawing the T-shape head —38— from the openings —37—. The opposite end of the plate —29— is provided with a shoulder —40— which fits into a slot —41— in the plate —27— to more firmly lock the two plates —27— and —28— to each other.

In all the several modifications of my invention hereinbefore described, the anchor rods are secured to one of the clamping plates and the clamping grooves of said plates are disposed in the same plane as the roller around which the guy wire is passed so that in tightening the guy wire, its opposite sides are brought into registration with the meeting edges of the clamping plates where they may be easily pressed or forced into the grooves of said plates and then clamped in place by tightening the bolts —13—.

What I claim is:

1. A guy wire fastener comprising separable wire clamping plates for receiving the wire between them, and means for drawing said plates together, a roller bearing mounted on one of the plates in the plane of the meeting edges of said plates, and an anchor rod secured to one of said plates.

2. A guy wire fastener comprising a pair of wire clamping plates, and means to draw them together, a sheave mounted on one of the plates, and an anchor rod detachably connected to one of said plates.

3. A guy wire fastener comprising two clamping plates, a sheave, and an anchor rod, the sheave and anchor rod being located in the plane of the meeting edges of the clamping plates and means to draw the clamping plates together.

4. A guy wire fastener comprising separable plates having parallel grooves for receiving the guy wire, a sheave mounted on one end of the plates at one end of said grooves, and an anchor rod secured to one of the plates at the side of the sheave opposite to that in which the grooves are formed, and means to draw the clamping plates together.

In witness whereof I have hereunto set my hand this 26th day of February 1907.

AARON BEARSE.

Witnesses:
H. E. CHASE,
C. M. McCORMACK.